(12) United States Patent
Kaefer

(10) Patent No.: US 9,574,478 B2
(45) Date of Patent: Feb. 21, 2017

(54) EXHAUST GAS POSTTREATMENT DEVICE FOR AN INTERNAL COMBUSTION ENGINE

(75) Inventor: Sebastian Kaefer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1485 days.

(21) Appl. No.: 13/000,941

(22) PCT Filed: Apr. 24, 2009

(86) PCT No.: PCT/EP2009/054926
§ 371 (c)(1),
(2), (4) Date: Feb. 9, 2011

(87) PCT Pub. No.: WO2009/156204
PCT Pub. Date: Dec. 30, 2009

(65) Prior Publication Data
US 2011/0283677 A1    Nov. 24, 2011

(30) Foreign Application Priority Data

Jun. 24, 2008   (DE) ........................ 10 2008 002 612

(51) Int. Cl.
*F01N 3/10*   (2006.01)
*F01N 3/20*   (2006.01)

(52) U.S. Cl.
CPC ......... *F01N 3/2066* (2013.01); *F01N 2610/02* (2013.01); *F01N 2610/06* (2013.01); *F01N 2610/10* (2013.01); *F01N 2610/14* (2013.01); *F01N 2610/1406* (2013.01); *F01N 2900/1808* (2013.01); *Y02T 10/24* (2013.01)

(58) Field of Classification Search
USPC .......... 60/274, 286, 295, 297, 301, 300, 303
See application file for complete search history.

(56) References Cited

U.S. PATENT DOCUMENTS

| | | | |
|---|---|---|---|
| 5,884,475 A * | 3/1999 | Hofmann et al. ............... | 60/274 |
| 6,301,879 B1 | 10/2001 | Weisweiler et al. | |
| 6,387,336 B2 * | 5/2002 | Marko et al. ................. | 423/212 |
| 6,935,103 B2 * | 8/2005 | Binder et al. ................... | 60/286 |
| 7,332,142 B2 * | 2/2008 | Telford et al. ................ | 423/210 |
| 7,964,163 B2 | 6/2011 | Johannessen et al. | |
| 8,088,201 B2 * | 1/2012 | Johannessen ................... | 96/108 |
| 8,424,724 B2 * | 4/2013 | Op De Beeck et al. .. | 222/146.1 |
| 2004/0025498 A1 | 2/2004 | Lambert et al. | |
| 2007/0119153 A1 * | 5/2007 | Pierz et al. ..................... | 60/286 |
| 2009/0065508 A1 | 3/2009 | Haeberer et al. | |
| 2009/0078692 A1 | 3/2009 | Starck | |
| 2010/0078426 A1 * | 4/2010 | Li et al. ........................ | 219/600 |
| 2010/0146940 A1 * | 6/2010 | Goulette et al. ............... | 60/286 |

(Continued)

FOREIGN PATENT DOCUMENTS

| CN | 2928743 | 8/2007 |
|---|---|---|
| DE | 102004048076 | 4/2006 |

(Continued)

*Primary Examiner* — Binh Q Tran
(74) *Attorney, Agent, or Firm* — Michael Best & Friedrich LLP

(57) ABSTRACT

The invention relates to an exhaust gas after-treatment device and a method, having a storage container and a buffer reservoir, both of which can be heated. In this manner it is possible to significantly reduce the energy requirement for providing gaseous ammonia for an exhaust gas after-treatment device of an internal combustion engine.

20 Claims, 2 Drawing Sheets

(56) References Cited

U.S. PATENT DOCUMENTS

2010/0229532 A1* 9/2010 Ohno .......................... 60/274

FOREIGN PATENT DOCUMENTS

| DE | 102006027487 A1 | 3/2007 |
|----|---|---|
| DE | 102006046900 A1 | 4/2008 |
| EP | 0238383 | 9/1987 |
| EP | 0928884 A2 | 7/1999 |
| WO | 2008077652 A2 | 3/2007 |

* cited by examiner

EXHAUST GAS POSTTREATMENT DEVICE FOR AN INTERNAL COMBUSTION ENGINE

CROSS-REFERENCE TO RELATED APPLICATION

This application is a 35 USC 371 application of PCT/PCT/EP 2009/054926 filed on Apr. 24, 2009.

BACKGROUND OF THE INVENTION

Field of the Invention

The invention relates to an exhaust gas after-treatment device and a method for exhaust gas after-treatment.

Description of the Prior Art

The nitrogen oxide or NOx emissions limit values, which are becoming evermore stringent for diesel- or lean-engine-operated vehicles, require exhaust gas posttreatment that reduces the nitrogen oxides, beyond a certain vehicle weight. A very effective exhaust gas posttreatment known from the prior art is known as the selective catalytic reaction (SCR). In it, a reducing agent, namely ammonia, is injected as needed into the exhaust gas posttreatment device of the internal combustion engine and reacts in a special catalytic converter together with the nitrogen oxides of the exhaust gases to form the harmless compounds of nitrogen and water. One example of this kind of SCR exhaust posttreatment with gaseous reducing agent is known from International Patent Disclosure WO 99/012105.

In the exhaust gas posttreatment device known from the prior art, an ammonia storage substance, or a mixture of various ammonia storage substances, is present in the storage container, and from these substances, ammonia is released by thermal desorption or thermolysis, or in other words by the effect of temperature. Suitable storage substances can for instance be salts, in particular chlorides or sulfates or one or more alkaline earth elements, such as $MgCl_2$ or $CaCl_2$ and/or one or more 3d side group elements, such as manganese, iron, cobalt, nickel, copper, and/or zinc.

Organic absorbers and ammonium salts, such as ammonium carbamate, are also suitable ammonia storage substances that can be used in the exhaust gas posttreatment device of the invention and the method of the invention. It is definitive for all these substances that the decomposition process is completely reversible. This means nothing else than that after the reservoir has cooled down to the initial temperature level, the initial substances are present again in unchanged form.

In order for the driver of a vehicle equipped with this kind of exhaust gas posttreatment device not to have to refill the storage container himself, the storage capacity of the storage container is designed such that it does not need to be refilled except during scheduled maintenance, such as an inspection.

In practice, a storage volume of approximately 10 liters has proved suitable. A reservoir with a volume has a not inconsiderable thermal capacity.

Since, because of thermal conduction inside the storage container, a virtually constant temperature prevails in the entire storage container, every time the engine is started the storage container, which has meanwhile cooled down, must be reheated again to the operating temperature of 60° C. or 70° C., for example. The resultant energy consumption leads to an increase in fuel consumption of the engine.

OBJECT AND SUMMARY OF THE INVENTION

It is the object of the invention to furnish an exhaust gas posttreatment device and a method for operating an exhaust gas posttreatment device of this kind whose energy consumption is markedly reduced compared to the prior art. Moreover, the embodiment according to the invention should be economical and problem-free.

In an exhaust gas posttreatment device for an internal combustion engine, having an exhaust gas tube, having an SCR catalytic converter, having a metering valve for injecting a gaseous reducing agent into the exhaust gas tube, having a heatable storage container for the reducing agent, and having a buffer reservoir, this object is attained according to the invention in that the buffer reservoir is heatable.

Since the buffer reservoir has only a fraction of the storage volume of the storage container, the energy consumption for heating the buffer reservoir is very much less than in the exhaust gas posttreatment device of the prior art. The storage container of the exhaust gas posttreatment device of the invention, unlike in the prior art, is not heated every time the engine is put into operation but rather only whenever the buffer reservoir is nearly completely empty and has to be refilled with reducing agent from the heatable storage container. As a result, the storage container is heated only comparatively seldom, and thus the energy for heating the storage container in the exhaust gas posttreatment device of the invention can be reduced markedly compared to the prior art.

The exhaust gas posttreatment devices of the invention furthermore offer advantages in terms of energy management. For instance, the storage container and/or the buffer reservoir can be electrically heated. Alternatively, it is also possible for the storage container, in particular, to be heated with a liquid heat transfer medium, especially coolant or the motor oil, and/or the waste heat contained in the exhaust gases of the engine. As a result, the waste heat that occurs anyway during engine operation can be utilized. It is also possible, by a combination of electric heating and heating by means of a liquid heat transfer medium, to combine the advantages of the two types of heating and thereby also reduce the demand for electrical energy for heating the storage container and/or the buffer reservoir.

To ensure that the buffer reservoir will not empty itself into the storage container, a check valve or alternatively a switching valve is provided between the storage container and the buffer reservoir.

It is furthermore provided that a pressure sensor and/or overpressure valve is disposed between the buffer reservoir and the metering valve.

With the aid of the pressure sensor, it is possible, taking into account the temperature of the buffer reservoir and the storage container, to ascertain the charge state of the buffer reservoir and as a result to trip the refilling of the buffer reservoir with ammonia from the storage container.

In a further advantageous embodiment of the invention, it is provided that at least the storage container has a heat insulator. As a result, the energy losses are reduced, and the heat energy demand for the storage container and/or the buffer reservoir is reduced still further.

Since in modern motor vehicles there is often only little space for a storage container, it is provided in a further advantageous feature of the invention that the storage container is subdivided into a plurality of decentralized partial storage containers. As a result, the requisite storage volume can be distributed among various "niches" in the vehicle and thus the existing space can be optimally utilized.

If a plurality of partial storage containers is present, then a check valve or alternatively a switching valve is provided between the buffer reservoir and each partial storage container.

In a method for operating an exhaust gas posttreatment device for an internal combustion engine, having an exhaust gas tube, having an SCR catalytic converter, having a metering valve for injecting a gaseous reducing agent into the exhaust gas tube, having a heatable storage container for the reducing agent, and having a heatable buffer reservoir, the object stated at the outset is also attained in that the buffer reservoir is heated each time the engine is put into operation; and that the storage container is heated only for charging the buffer reservoir.

As a result, the advantages of the invention are attained, namely the economy in terms of heating energy for the storage container.

In a further advantageous feature of the method of the invention, to make it possible to ascertain fully automatically by means of the engine control unit whether the buffer reservoir needs to be recharged, a pressure sensor which detects the ammonia pressure prevailing in the buffer reservoir is provided.

Since there is a relationship between the charge state and the ammonia pressure in the buffer reservoir, and this relationship depends essentially only on the temperature of the buffer reservoir, the charge state of the buffer reservoir can be ascertained from the ammonia pressure prevailing in the buffer reservoir. In good time before complete emptying of the buffer reservoir occurs, the storage container is then heated. This is preferably done according to the invention when the engine is still in operation. The on-board electrical system then has enough power to heat the storage container. It is especially advantageously if the heater of the storage container is preferentially activated whenever the engine is in the overrunning mode, or in other words for instance during a braking event or when driving downhill. Then the mechanical energy required for driving the generator can in fact be recovered from the kinetic energy stored in the vehicle, without an additional expenditure of force.

Further advantages and advantageous features of the invention can be learned from the ensuing drawings, their description, and the claims. All the characteristics disclosed in the drawings, their description, and the claims can be essentially to the invention both individually and in arbitrary combination with one another.

BRIEF DESCRIPTION OF THE DRAWINGS

The invention will be described in detail below in conjunction with the accompanying drawings, in which.

DESCRIPTION OF THE PREFERRED EMBODIMENT

Figure 1:
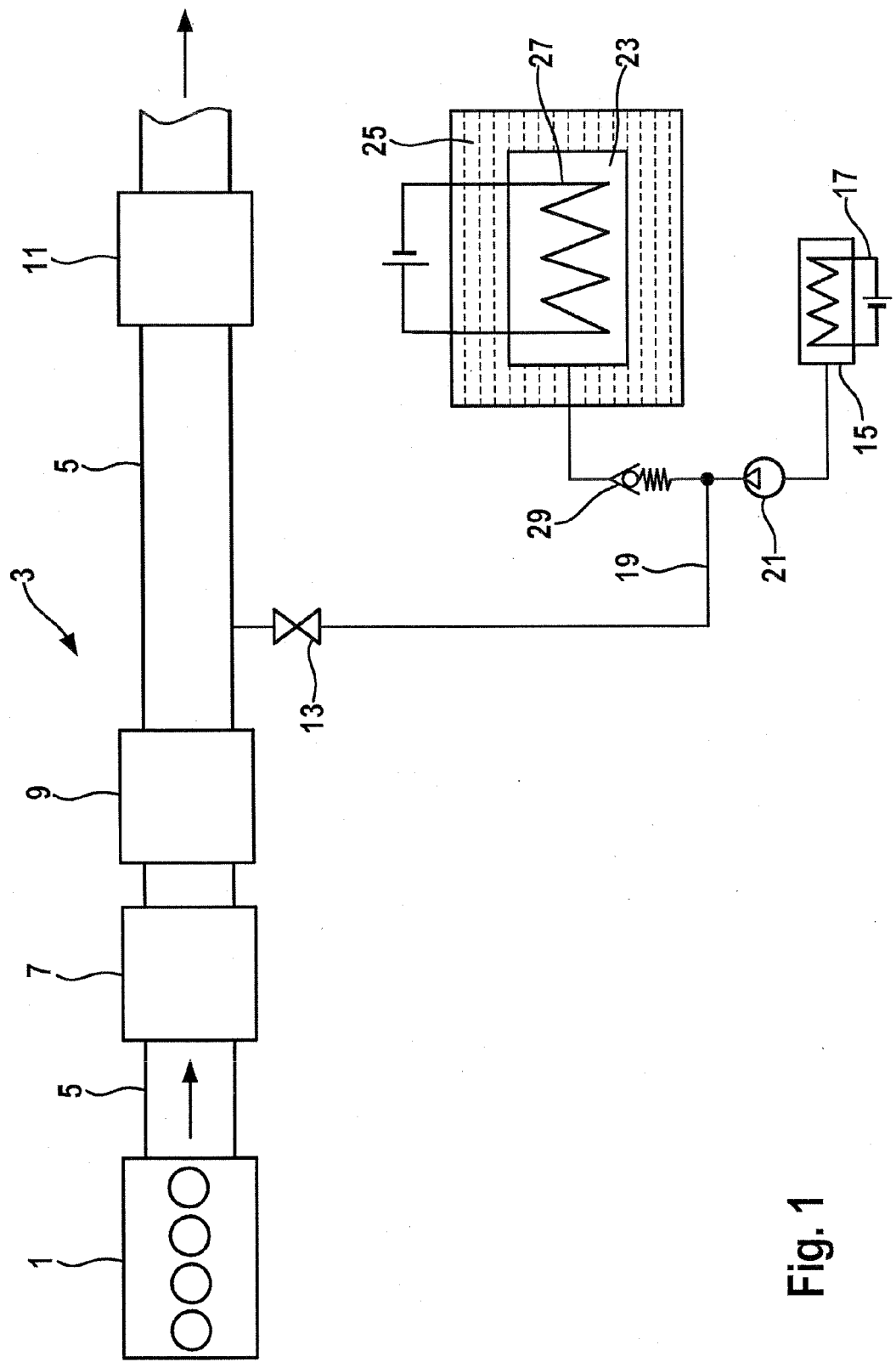
FIG. 1, the schematic layout of an exhaust gas posttreatment device according to the invention.

In FIG. 1, an internal combustion engine 1 with an exhaust gas posttreatment device 3 is shown, highly simplified and schematically. The exhaust gas posttreatment device 3 includes an exhaust gas tube 5, an oxidation catalytic converter 7, a particle filter 9, and an SCR catalytic converter 11. The flow direction of the exhaust gas through the exhaust gas tube 5 is indicated by arrows (without reference numerals).

For supplying the SCR catalytic converter 11 with reducing agent, a metering valve 13 for the reducing agent is disposed upstream of the SCR catalytic converter 11, on the exhaust gas tube 5. The metering valve 13 injects gaseous reducing agent as needed into the exhaust gas tube 5 upstream of the SCR catalytic converter 11.

The metering valve 13 is opened as needed, via an engine control unit, not shown, so that gaseous ammonia can flow from a buffer reservoir 15 to the exhaust gas tube 5. The buffer reservoir 15, in the exemplary embodiment shown in FIG. 1, has an electric resistance heater 17, which is activated each time the engine is turned on. It is understood that the electric resistance heater 17 may have a power regulator, not shown, for limiting the consumption of electrical energy to what is necessary.

A pressure sensor 21 is disposed in a connecting line 19 between the buffer reservoir 15 and the metering valve 13. This pressure sensor 21 can be used to regulate the power of the electric heater 17. Between the pressure in the buffer reservoir 15, or in the connecting line 19, that is filled with gaseous ammonia and the temperature of the buffer reservoir 15, there is an unambiguous relationship, so that from the ammonia pressure that is detected by the pressure sensor 21, the temperature of the buffer reservoir 15 can be ascertained.

It is furthermore possible, from the temperature and the pressure in the buffer reservoir 15, to draw a conclusion about the charge state of the buffer reservoir 15. From the temperature, the quantity of energy contained in the buffer reservoir 15 can be ascertained. Taking into account the pressure in the buffer reservoir 15, the charge state of the buffer reservoir 15 can be ascertained from this quantity of energy. The quantity of energy contained in the buffer reservoir 15 can also be ascertained by means of an energy balance that takes into account the heating capacity introduced and the heat losses.

The pressure sensor 21, like the metering valve 13, is connected to the engine control unit via signal lines, not shown.

In the exhaust gas posttreatment device of the invention, a storage container 23 is also present, which is surrounded by a heat insulator 25. The storage container 23 furthermore also has a heater, embodied here as an electric resistance heater 27. Between the storage container 23 and the buffer reservoir 15, a check valve 29 is provided, which ensures that only gaseous ammonia can flow out of the storage container 23 into the buffer reservoir, and the return path is closed. The storage volume of the buffer reservoir 15 is markedly smaller than the storage volume of the storage container 23, since the latter has to suffice for the travel distance between two regular inspection intervals, which for example is 20,000 km to 30,000 km.

The storage volume of the buffer reservoir 15 is dimensioned such that the average distance traveled in a vehicle without shutting off the engine can be covered with the ammonia stored in the buffer reservoir 15. The optimum is between 10 and 100 cycles, preferably between 30 and 60 cycles, before the buffer reservoir has to be recharged. The buffer reservoir 15 is in fact heated every time the engine is turned on, and it naturally cools down again from heat losses to the environment after the engine is shut off. It has proved advantageous if the ratio of the storage capacity of the storage container 23 and of the buffer reservoir 15 is approximately 66:1, corresponding for instance to a storage capacity of the storage container 23 of 10 kg and of the buffer reservoir 15 of 150 g. The storage container 23 is heated only whenever the buffer reservoir 15 is just about to become empty. Charging the buffer reservoir 15 with ammonia stored in the storage container 23 will be described in further detail below in conjunction with FIG. 2.

Figure 2:
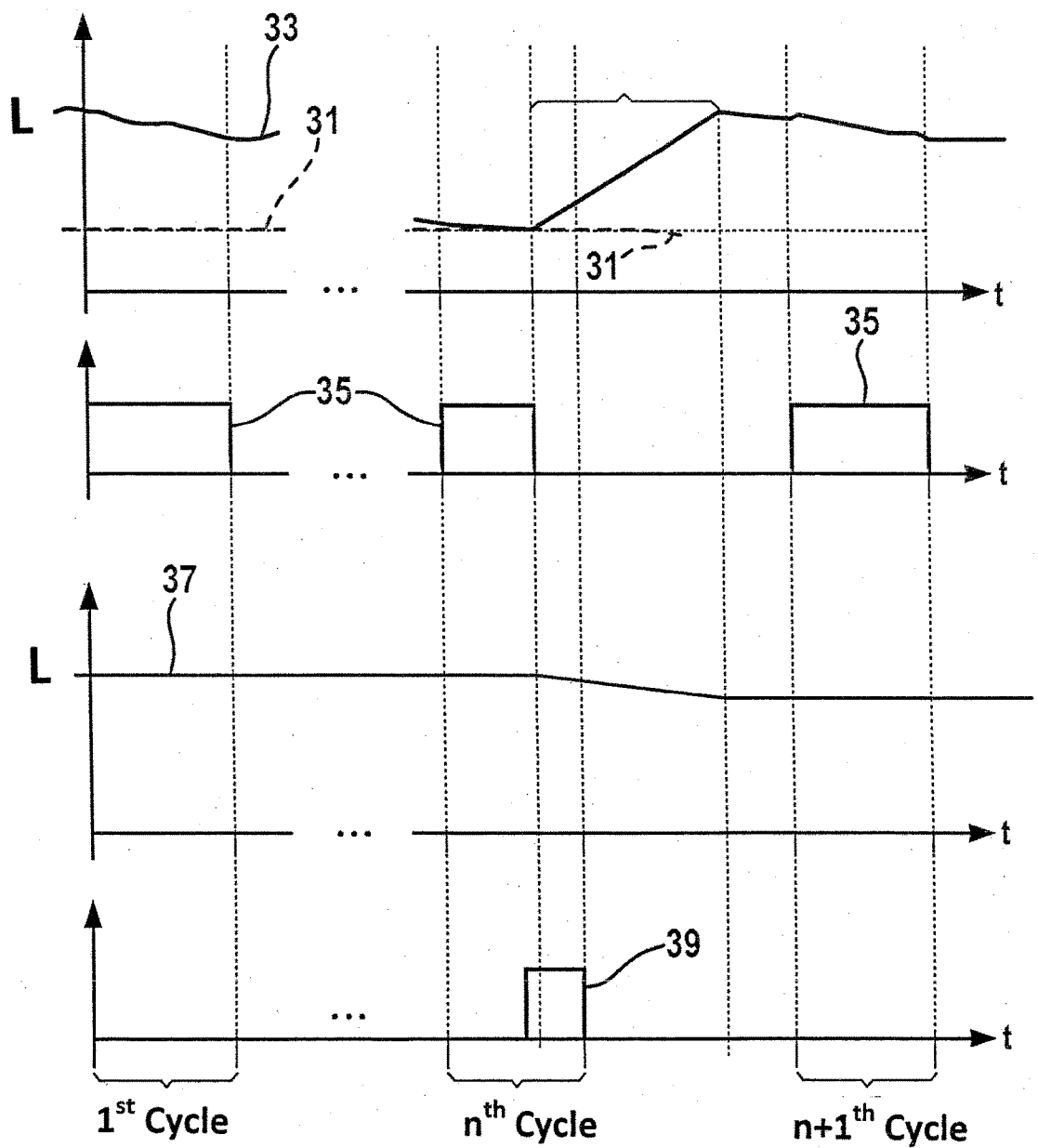
FIG. 2, one exemplary embodiment of a method of the invention.

In FIG. 2, in a total of four graphs one above the other, the ammonia filling of the buffer reservoir 15 (see line 33), the ON time of the electric resistance heater 17 (see line 35) of the buffer reservoir 15, the ammonia filling of the storage container 23 (see line 37), and the ON time of the electric heater 27 (see line 39) of the storage container 23 are plotted.

In a first cycle of the motor vehicle, that is, when the engine is started and the buffer reservoir 15 is full, corresponding to a filling at the standardized fill level 1, when the engine is started the heater 17 of the buffer reservoir 15 is activated (see line 35) and is active, with one exception, as long as the vehicle is in operation. The heat demand decreases in the exhaust gas posttreatment device of the invention to less than 20% of a conventional system. As the topmost line in FIG. 2 shows, the fill level in the buffer reservoir 15 decreases continuously during the first cycle. However, the charge state of the buffer reservoir 15 is still markedly higher than a limit filling 31 that is indicated by a dashed line 31 in FIG. 2.

It is therefore unnecessary during the first cycle for the buffer reservoir 15 to be charged with ammonia from the storage container 23. Consequently, the heater 27 of the storage container 23 remains off in the first cycle, and the charge state of the storage container 23 also remains unchanged, at the outset value 1.

When the motor vehicle is shut off, and in other words a cycle is ended, the heater 17 is also shut off, and the buffer reservoir 15 cools down.

If now, in the $n^{th}$ cycle, the buffer reservoir 15 has emptied enough that it reaches the limit charge 31, recharging of the buffer reservoir 15 with ammonia from the storage container 23 is necessary. This is done in that when the limit charge 31 is reached, the heater 17 of the buffer reservoir is shut off. A short time before that, the heater 27 of the storage container 23 is activated, since the storage container 23 requires a certain amount of time until it is ready for operation. As a result of the shutoff of the heater 17 of the buffer reservoir 15 after the limit charge is reached, the buffer reservoir 15 cools down, while at the same time the temperature of the storage container 23 rises. The result is an overpressure of the ammonia in the storage container 23, as a result of which gaseous ammonia flows from the storage container 23 through the check valve 29 into the buffer reservoir 15. There, because of the reversibility of the storage operation and the decrease in temperature of the buffer reservoir 15, it is stored in the storage material. This process can also continue after the shutoff of the vehicle, that is, after the end of the $n^{th}$ cycle, until the buffer reservoir 15 has again reached the initial charge of 1.0. After that, in the $n+1^{th}$ cycle, the method already described in conjunction with the first cycle begins all over again.

Even from this simple description it will have become clear that the storage container 23 needs to be heated only once every $n^{th}$ operating cycle, while in the method of the prior art it had to be heated in every travel cycle. As a result, there is a drastic reduction of energy needed for heating the storage container 23 and consequently an entirely relevant fuel economy.

The foregoing relates to the preferred exemplary embodiment of the invention, it being understood that other variants and embodiments thereof are possible within the spirit and scope of the invention, the latter being defined by the appended claims.

The invention claimed is:

1. An exhaust gas posttreatment device for an internal combustion engine, comprising:
an exhaust gas tube; an SCR catalytic converter; a metering valve for injecting a gaseous reducing agent into the exhaust gas tube; a heatable storage container containing at least one storage substance for the reducing agent; and a buffer reservoir wherein the buffer reservoir is heatable, the storage substance is embodied such that the reducing agent can be released in gaseous form from the storage substance by the action of temperature in a releasing process which is reversible, and wherein an overpressure valve is provided between the buffer reservoir and the metering valve.

2. The exhaust gas posttreatment device as defined by claim 1, wherein at least one of the storage container and the buffer reservoir is electrically heatable.

3. The exhaust gas posttreatment device as defined by claim 1, wherein at least one of the storage container and the buffer reservoir is heatable with a liquid heat transfer medium, in particular coolant of the engine.

4. The exhaust gas posttreatment device as defined by claim 1, wherein a check valve is provided between the storage container and the buffer reservoir.

5. The exhaust gas posttreatment device as defined by claim 2, wherein a check valve is provided between the storage container and the buffer reservoir.

6. The exhaust gas posttreatment device as defined by claim 3, wherein a check valve is provided between the storage container and the buffer reservoir.

7. The exhaust gas posttreatment device as defined by claim 1, wherein a pressure sensor is provided between the buffer reservoir and the metering valve.

8. The exhaust gas posttreatment device as defined by claim 6, wherein a pressure sensor is provided between the buffer reservoir and the metering valve.

9. The exhaust gas posttreatment device as defined by claim 1, wherein the storage container has a heat insulator.

10. The exhaust gas posttreatment device as defined by claim 1, wherein the storage container is subdivided into a plurality of decentralized partial storage containers.

11. A method for operating an exhaust gas posttreatment device for an internal combustion engine, having an exhaust gas tube, having an SCR catalytic converter, having a metering valve for injecting a gaseous reducing agent into the exhaust gas tube, having a heatable storage container containing at least one storage substance for the reducing agent, and having a heatable buffer reservoir, the method comprising the steps of:
heating the buffer reservoir each time the engine is put into operation;
heating the storage container only during charging of the buffer reservoir; and
embodying the storage substance such that the reducing agent can be released in gaseous form from the storage substance by the action of temperature in a releasing process which is reversible.

12. The method as defined by claim 11, further comprising the step of ascertaining the charge state of the buffer reservoir via the temperature of a storage medium prevailing in the buffer reservoir, taking pressure into account.

13. The method as defined by claim 11, wherein the buffer reservoir is not heated during the charging.

14. The method as defined by claim 12, wherein the buffer reservoir is not heated during the charging.

15. The method as defined by claim 11, wherein an electric heater of the storage container is activated during the operation of the engine, preferably when the engine is in the overrunning mode.

16. The method as defined by claim 12, wherein an electric heater of the storage container is activated during the operation of the engine, preferably when the engine is in the overrunning mode.

17. The method as defined by claim 13, wherein an electric heater of the storage container is activated during the operation of the engine, preferably when the engine is in the overrunning mode.

18. A control unit for an internal combustion engine, which operates by the method of claim 11.

19. A non-transitory computer readable medium storing computer program instructions for a control unit of an internal combustion engine, wherein when the instructions are executed, the control unit performs a method as defined by claim 11.

20. A non-transitory computer readable medium storing computer program instructions for a control unit of an internal combustion engine, wherein when the instructions are executed, the control unit performs a method as defined by claim 17.

* * * * *